3,539,785
POWER DEMAND COMPUTER
Edward C. Baker, Philadelphia, Pa., assignor to Honeywell Inc., Minneapolis, Minn., a corporation of Delaware
Filed Mar. 4, 1968, Ser. No. 710,203
Int. Cl. G01r 21/00; G06g 7/48
U.S. Cl. 235—151.21                6 Claims

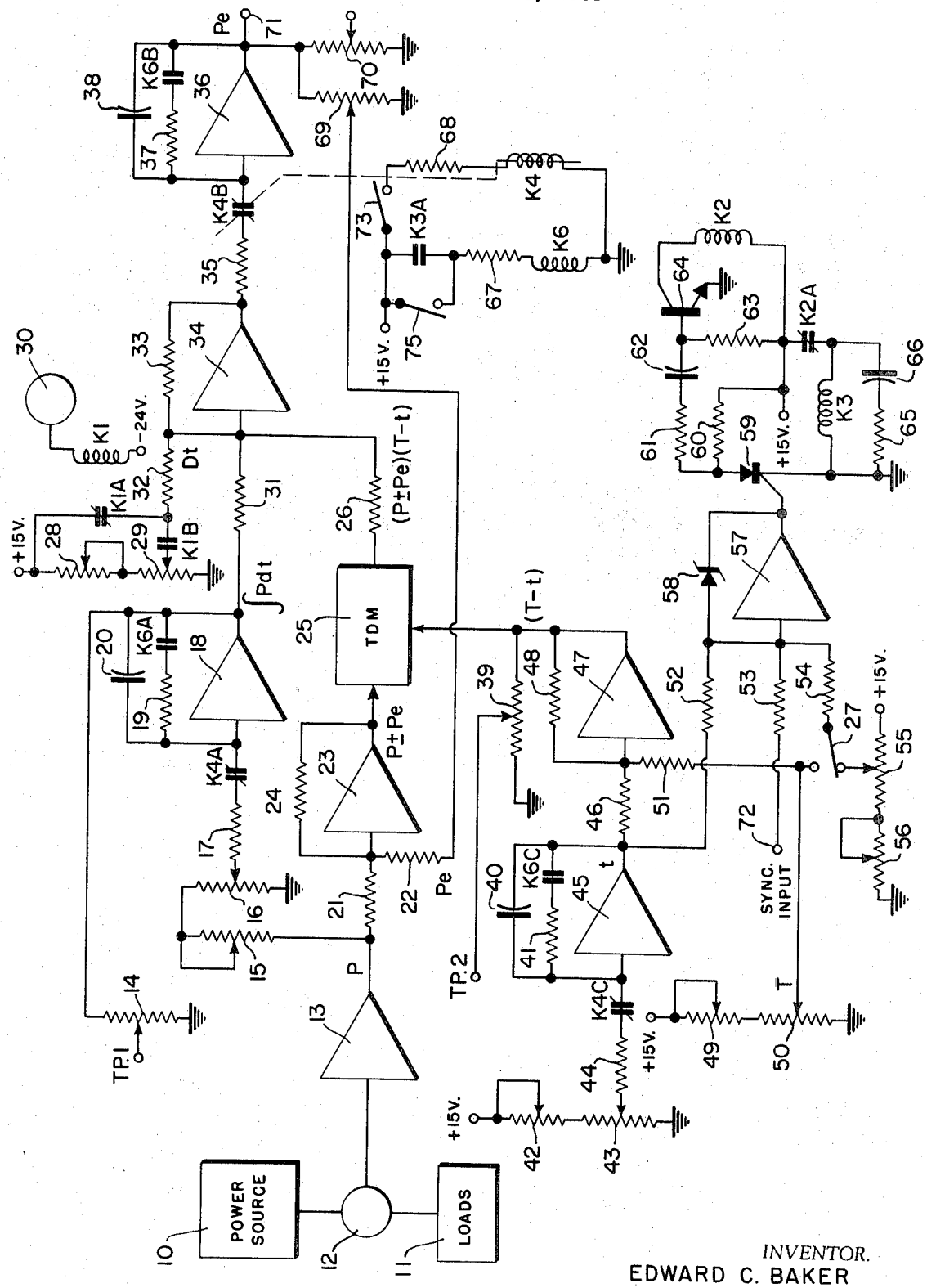

ABSTRACT OF THE DISCLOSURE

There is provided a computer which detects the power usage of a physical system, compares a signal indicative of the power usage with a reference signal indicative of a limit of power to be used and provides a signal representative of the comparison. The signal which is representative of the comparison is combined with the initially mentioned signal, multiplied by a time function and fed back to the comparator to vary the operation thereof in order to, ideally, produce a zero error output signal.

---

This invention relates to equipment for measuring and performing calculations in respect to consumption of power which consumption continues throughout a period of time at a possibly nonuniform rate and which is to be limited in the total quantity accumulatively consumed through that period.

In the supply of electric power to a large consumer it is a common practice to fix a maximum rate or maximum demand in kw. at which power is to be taken and to impose heavy penalties for exceeding this maximum. This practice follows primarily from the practical consideration that the equipment carrying the supply to the consumers is limited in its capacity and that it would be dangerous if an excessive flow were sustained for any length of time.

Accordingly, the invention is particularly adapted for the measurement and control of the consumption of electric energy. Typically, the maximum rate which should not be exceeded to avoid a penalty charge is expressed as a maximum quantity not to be exceeded over a prescribed period, for example 15 or 30 minute periods. This is a permissible approximation since, as stated above, it is a sustained rather than a momentary overload that is dangerous.

Furthermore, the charge for the supply of electricity includes a fixed charge which is proportionate to the maximum rate. A consumer buys electricity most economically when the consumption is uniform and as close to the maximum rate as possible.

There are several power demand computers available on the market. For the most part, these computers compare a power demand of an environmental system against a predetermined limit and drop loads from the system when the limit is exceeded. These devices have a distinct disadvantage in that loads, for example, generators, furnaces or the like may be dropped at inconvenient and inopportune times relative to the operation thereof. Moreover, the individual load which is dropped may have a requirement such that an inefficient usage of the power available is made. That is, the load may be dropped too early in the demand cycle so that less than 100% of the demand capabilities are utilized. Moreover, a large transient signal may be capable of causing a load to be dropped from the system erroneously and without proper requirement therefore.

In addition, most of the power demand computers (or meters) which are known in the art operate to produce output signals which are indicative of the kilowatt hours (kwh.) which remain or which have been used by the physical system. This indication is difficult for the operator to evaluate inasmuch as the individual loads may have kilowatt ratings which vary and the time remaining in the demand period is, of course, variable.

Also, the power demand computing systems known heretofore, usually operate on the principle of counting demand pulses which are supplied by the power company thereby giving stepwise indication of the power consumption. This stepwise indication is also undesirable because of the difficulty in operating thereupon to effect a highly efficient and readily controllable power utilization.

The instant invention avoids many of the difficulties of the prior art. Thus, the invention hereindescribed operates by continuously sampling the instantaneous value of the power utilization by the physical system. The power demand computer of the subject invention continuously renders an instantaneous evaluation of the power which has been utilized as of the reading of the demand. Moreover, the subject power demand computer produces an error signal which is indicative of the amount of power which can be utilized and still fall within the demand limits. This has the effect of producing a more efficient operation. Moreover, through a suitable feedback arrangement, the power signals are converted from kwh. to kw. signals wherein the operator of the system knows specifically how much load can be added or dropped under the existing conditions. In addition, various resetting, demand limit alteration and the output test points are provided for optional embodiments.

Consequently, one object of this invention is to provide a power demand computer.

Another object of this invention is to provide a power demand computer which produces an output signal indicative of the power load which can be added to or dropped from the system.

Another object on this invention is to provide power demand computer which produces an output indication in killowatts.

Another object of this invention is to provide a power demand computer which produces an output indication in terms of killowatts on a substantially instantaneous basis.

Another object of this invention is to provide a power demand computer whereby efficient usage of the power demand cycle is utilized.

A time signal defining a predetermined time called, the demand period, T is generated. This time signal forms a reverse sawtooth wave, $(T-t)$, with its maximum at the beginning of the time period.

The power signal P is multiplied by the time signal $(T-t)$ thereby providing a function for projecting the energy consumption during the unexpired time remaining in the demand period T measured from time $t$ to time T.

The power signal P is integrated, thereby defining the energy consumed, $$\int_0^t P\,dt$$

from the beginning of the demand period to time $t$.

The sum of the signals $$\int_0^t P\,dt + P(T-t)$$

defines a projected total energy consumption for the demand period, T. This sum is subtracted from the signal representing the predetermined energy consumption or demand limit, $Dt$, for a demand period, T.

The result is $$Dt - \int_0^t P\,dt - P(T-t) = E_e$$

where $E_e$ is the projected error, in energy, over the demand period, $T$.

The projected energy error signal $E_e$ is integrated to form another error signal $P_e$. $P_e$ is fed back, added to $P$, and multiplied by $(T-t)$. Thereby, term $P(T-t)$ at the multiplier output, is modified to include $P_e(T-t)$.

When the feedback signal is integrated with the other terms in Equation A, the intergral becomes a measure of the amount and sense by which the load must be charged in order to meet the predetermined total energy consumption, or demand limit, for the demand period, $T$.

These and other objects and advantages of this invention will become more readily apparent when the following description is read in conjunction with the attached drawings, in which the single figure is a schematic diagram of one embodiment of the subject invention.

Referring to the figure, a power source 10 which may be any suitable source, for example a power generating facility or the like, is connected to a plurality of loads 11 via a suitable detector 12. The loads 11 which may be furnaces, generators, motors or the like comprise the physical system which is to be controlled as to the power demands made upon source 10. The detector 12 may be any suitable detector e.g. a current transformer, which is useful in detecting the instantaneous magnitude of the power being supplied from source 10 to loads 11. The signal produced by detector 12 is applied to amplifier 13. Amplifier 13 is any suitable device which produces an output signal which is proportional to the input signal. Typically, the input signal may be on the order of millivolts, while the output signal is on the order of volts. The output signal P produced by amplifier 13 is connected via resistor 21 to the summing input of amplifier 23. Feedback resistor 24 is connected between the input and output of amplifier 23 to control the gain thereof. The output of amplifier 23 is connected to a time division multiplier (TDM) 25. A suitable TDM is shown and described in the co-pending application of W. H. Crowell, Ser. No. 675,596, filed Oct. 16, 1967, entitled Time Division Multiplier and assigned to the common assignee. The purpose of TDM 25 is to produce an output signal which is a function of the input signals supplied thereto and further described hereinafter. The copending application describes a suitable device for this purpose; however, other suitable circuits may be used. The output of TDM 25 is connected via resistor 26 to the summing input of amplifier 34.

Variable resistors 15 and 16 are connected in series between common and the output of amplifier 13. Resistor 15 provides coarse control of the signal supplied across potentiometer 16. The variable tap of resistor 16 is connected via resistor 17 and normally closed contacts K4A to the input of amplifier 18. Capacitor 20 is connected between the input and output of amplifier 18 to provide an integrating feedback circuit. Resistor 19 and normally open contacts K6A are connected in series with each other and in parallel with capacitor 20 to selectively short circuit capacitor 20 and reset the capacitor to an initial condition the output signal $\int Pdt$ of amplifier 18 is supplied via resistor 31 to the summing input of amplifier 34.

Variable resistors 28 and 29 are connected in series with each other between common and a +15 volt source. Resistor 28 provides coarse control of the potential supplied across potentiometer 29. Normally closed contacts K1A are connected between the +15 volt source and one terminal of resistor 32. The variable tap of potentiometer 29 is connected via normally open contacts K1B to the aforementioned one terminal of resistor 32. The other terminal of resistor 32 is connected to the summing input of amplifier 34. The coil K1 which controls contacts K1A and K1B is connected between a suitable source, for example −24 volts, and a typical timing switch 30.

The signal $Dt$ supplied via resistor 32 to the summing junction of amplifier 34 is representative of the upper limit of the power which can be consumed during a power cycle. The timing switch or clock 30 is optional and is primarily used when the power supplying facility has "peak" and "off-peak" periods during which different charges are made for the power. The clock 30 is set to energize coil K1 during predetermined time periods. As shown, coil K1 is energized during "peak" operation. That is, when coil K1 is energized, contacts K1B are closed and contacts K1A are opened such that the signal $Dt$ applied via resistor 32 is determined by the position of the variable tap of resistor 29. Obviously, in this embodiment, signal $Dt$ is between the limits of +15 volts and common.

In the alternative condition, coil K1 is deenergized and contacts K1A are closed and contacts K1B are open wherein the full upper limit voltage of +15 volts is supplied via resistor 32 to the input terminal of amplifier 34. Of course, the +15 volt upper limit is not limitative of the invention. Moreover, the signal potential may be taken at another point in the same or a different voltage divider network.

Amplifier 34 has the input thereof connected to the summing junction noted supra. The feedback resistor 33 is connected between the output and the input of amplifier 34. The output signal supplied by amplifier 34 is a sum of the input signals which is written $$Dt - \int Pdt - (P \pm P_e)(T-t) = 0$$

This signal is supplied via resistor 35 and normally closed contacts K4B to the input of amplifier 36. Capacitor 38 is connected in the feedback path between the output and input terminals of amplifier 36. Resistor 37 is connected in series with normally open contacts K6B and in parallel with capacitor 38. Again, contacts K6B are selectively closed to short circuit and initialize capacitor 38.

The output of amplifier 36 is connected to output terminal 71 where the error signal $P_e$ is detected. Output terminal 71 may be connected to any suitable output device, for example a read-out device wherein the KW error signal is indicated. In the alternative, the error signal $P_e$ may be supplied to an automatic controller which includes a programmer or the like for determining which of the loads 11 may be selectively dropped, the order of dropping the loads and the return of the loads as a function of the error signal. The output of amplifier 36 is also connected to variable resistors 69 and 70 which are referred to common. Resistor 70 is a scaling resistor which has the variable tap thereof connected to a suitable readout test point. Resistor 70 may be eliminated if a scaled output is unnecessary.

The variable tap of potentiometer 69 is connected via resistor 22 to the summing input junction at amplifier 23. The output signal $P_e$ is supplied to the summing junction and algebraically summed with the power signal $P$. The output of amplifier 23, thus, becomes $P \pm P_e$. As noted supra, this output signal is supplied as an input of TDM 25.

A voltage divider comprising variable resistors 49 and 50 is connected between a +15 volt source and common. Resistor 49 is used to provide a coarse control of the potential applied across resistor 50. The variable tap of potentiometer 50 is connected via resistor 51 to the summing input junction of amplifier 47. This signal is a substantially fixed signal and represents the demand period duration (T) as defined by the power supplying unit.

A further voltage divider network comprising variable resistors 42 and 43 is connected between a +15 volt source and common. Again, resistor 42 provides coarse control of the potential supplied across resistor 43. The variable tap of potentiometer 43 is connected via resistor 44 and normally closed contacts K4C to the input of amplifier 45. Integrating capacitor 40 is connected in the feedback path between the output and input of amplifier 45. Resistor 41 and normally open contacts K6C are connected in series with each other and in parallel with capacitor 40 to provide a selective reset control thereover. Amplifier 45 integrates the signal supplied thereto in accordance with the time constant of the RC network comprising resistor 44 and capacitor 40 and produces the output signal $t$. The signal $t$ is applied via resistor 46 to the summing junction at the input of amplifier 47.

Feedback resistor 48 is connected between the output and the input of amplifier 47. Thus, amplifier 47 operates as a summing amplifier and produces the output signal $T-t$ which signal is supplied as an input to the TDM 25. An optional variable resistor 39 is connected between the output of amplifier 47 and common. The variable tap of resistor 39 is connected to test point TP2 wherein an optional output signal indicative of the time remaining in the cycle is detected. The signal $T-t$ is supplied to TDM 25 and is used to multiply the other input signal $P \pm P_e$ to produce the output signal $(P \pm P_e)(T-t)$.

A comparator amplifier 57 is used to reset the circuit. Thus, the output of amplifier 45 is supplied via resistor 52 to the summing input of amplifier 57. In addition, a signal representative of the signal T is supplied via resistor 54. The signal is supplied to resistor 54 via switch 27. In one condition, switch 27 receives the signal T directly from the variable tap of resistor 50. In an alternative embodiment, a further voltage divider comprising resistors 55 and 56 is connected between the +15 volt source and common. Resistor 56 provides coarse control while the variable tap of resistor 55 is connected to one contact of switch 27. Switch 27 and the voltage divider comprising resistors 55 and 56 may be eliminated in some embodiments wherein the signal T is taken directly from resistor 50.

In addition, the sync input terminal 72 is connected via resistor 53 to the summing junction of resistor 57. The sync input may be applied by any suitable timing device to provide a periodic updating of the reset circuits and thereby the computing system. For example, the timing signal may be supplied to input terminal 72 at a predetermined time each day wherein the system is synchronized daily. Obviously, synchronizing pulses may be utilized at other rates of recurrence.

Zener diode 58 is connected in the feedback path between the output and input of amplifier 57. Thus, amplifier 57 is designed to provide an output signal which has a step wave shape upon the application of input signals which produce a predetermined level. Typically, in the daily operation, the signals T and $t$ are summed at the input of amplifier 57. When these signals total a predetermined level for example 0, the individual power demand cycle is terminated and the system is reset. The sum of the signals as noted is sufficient to trigger the comparator whereby the output signals supplied thereby switches, for example from a low level such as 0 volts to a relatively high level signal such as +5 volts.

In the alternative, at the predetermined synchronizing instant, the signal supplied at terminal 72 is sufficiently negative to cause amplifier 57 to change the output state thereof. Ideally, the algebraic sum of the signals supplied via resistors 52 and 54 will reach the reset level simultaneously with the signals supplied via resistor 53. In any event, the discrepancy in the signals should be inconsequential and the succeeding time between sync input signals will be substantially reset to the proper time base.

The output of amplifier 57 is connected to the gate electrode of silicon controlled switch (SCS) 59. The cathode of SCS 59 is connected to common. The anode of SCS 59 is connected to one end of each resistors 61 and 60. The other end of resistor 60 is connected to a +15 volt source. The other end of resistor 61 is connected via capacitor 62 to the base of transistor 64. The base of transistor 64 is connected to the +15 volt supply via resistor 63. The emitter of transistor 64 is connected to common. The collector of transistor 64 is connected via coil K2 to the +15 volt source. Normally closed contacts K2A are connected between the +15 volt source and one end of coil K3. Capacitor 66 and resistor 65 are connected in series with each other and in parallel with coil K3 which is returned to ground or common.

A series network comprising normally open contacts K3A, resistor 67 and coil K6 is connected between the +15 volt source and ground. The manual reset switch 75 is connected in parallel with normally open contacts K3A. A series connected network of normally open hold switch 73, resistor 68 and coil K4 is also connected between the +15 volt source and ground.

Initially, the lack of identity at the input signal terminal of amplifier 57 is effective to produce a relatively negative output signal at the output of amplifier 57. Thus, SCS 59 is turned off. Consequently, a relatively positive signal is applied at the base of transistor 64 wherein this transistor is turned on. When transistor 64 is conductive, current exists in coil K2 from the +15 volt source to ground via transistor 64. When coil K2 is energized, normally closed contacts K2A are opened whereby coil K3 is deenergized. When coil K3 is deenergized, contacts K3A remain open wherein coil K6 is deenergized. When coil K6 is deenergized, contacts K6A, K6B and K6C connected in parallel with amplifiers 18, 36 and 45 remain open and the amplifiers act as integrating circuits.

When the input signals supplied to amplifier 57 produce a comparison signal, the output of amplifier 57 switches to a relatively positive signal. This positive signal is applied to the gate electrode of SCS 59 rendering the device conductive. When SCS 59 is conductive, the common junction of resistors 60 and 61 are effectively connected to common or ground potential. This action has the effect of temporarily clamping the base of transistor 64 to common potential via capacitor 62 and resistor 61. This condition renders transistor 64 nonconductive thereby deenergizing coil K2. When coil K2 is deenergized contacts K2A close thereby connecting the +15 volt source across coil K3. When resistors 65 and capacitor 66 have operated upon the signal applied thereto, the coil K3 is fully energized and closes contacts K3A. When contacts K3A are closed, current is passed therethrough and through resistor contacts K6A, K6B and K6C in parallel with amplifiers 18, 36 and 45 are closed thereby short circuiting the respective integrating capacitors 20, 38 and 40 to terminate the integrating function of the amplifiers and to initialize the capacitors.

As soon as the differentiating circuit comprising resistor 61 and capacitor 62 has functioned, i.e. capacitor 62 is fully charged, the +15 volt source is applied to the base of transistor 64 via resistor 63. Transistor 64 is rendered conductive, thereby energizing coil K2 such that the contacts K2 are opened and the initial conditions are reinstated wherein the integrating amplifiers are no longer shorted and can function as integrators.

Switch 75 is used to provide manual control of the reset of the integrating amplifiers as for example during calibration or the like. Similarly, switch 73 provides manual control over the operation wherein a HOLD condition may be desired. That is, closure of switch 73 produces current flow therethrough and through resistor 68 to coil K4. When coil K4 is energized, contacts K4A, K4B, and K4C at the inputs of amplifiers 18, 36 and 45 are opened and no further integration is performed. However, the integrating amplifiers remain substantially constant at the condition prior to the hold condition.

The operation of the system, as a whole, will be described. The power, or energy consumption rate, sensed by the detector 12 is fed into the amplifier 13. The amplifier output is scaled to represent the actual instantaneous power consumption of the load 11. The amplifier 45 integrates the D.C. signal from the potentiometer 43, producing a ramp signal whose magnitude is proportional to the elapsed time, $t$. The contact K6C closes momentarily and short circuits the integrating capacitor 40 at the end of each predetermined time period or demand period T thereby producing a sawtooth wave. In the summing amplifier 47, the sawtooth signal is added algebraically to (subtracted from) a reference voltage, the magnitude of which represents the predetermined time period T. The sum of the two aforementioned signals produces a reverse sawtooth signal which has a maximum value at the beginning of the predetermined time period T. The reverse sawtooth signal provides a time function $(T-t)$ for the multiplier 25. For the purposes of the explanation of the present invention, the signal P will be considered as being representative of the instantaneous power consumed, or rate of energy consumed. The instantaneous power signal P is fed into the integrating amplifier 18, the output of which will then be the integral of the instantaneous power, $$\int_0^t P\,dt$$

which is the energy consumed during the elapsed portion of the predetermined time, or demand period T. The power signal P, at the output of the amplifier 13, is fed into the amplifier 23. The output of the amplifier 23 is then fed into a time division multiplier, 25, where P is multiplied by the quantity $(T-t)$. This time function $(T-t)$, appears as a sawtooth wave with its maximum value at a time $T=0$, and which decreases towards 0 as $t$ increases toward T and equals 0 at the end of the demand period T. At the output of the time division multiplier 25, the power P, comprises part of a signal $P(T-t)$. The output signal $P(T-t)$ is then fed to the input of the summing amplifier 34. Another input of the amplifier 34, is a signal representative of the predetermined energy consumption, or demand limit, for the demand period T. Assuming now, for example, that the loads 11 draw a constant power from the power source 10 over an entire demand period, such that, the actual energy consumption will be equal to the predetermined demand limit, for the demand period T. The sum of the energy, $$\int_0^t P\,dt$$

which has been drawn from the power source 10 during the elapsed time $t$, within the demand period T and the instantaneous power P, multiplied by the unelapsed time in the demand period, which is $P(T-t)$ can be expressed as the projected energy consumption, $$\int_0^t P\,dt + P(T-t)$$

The projected energy consumption will in this case equal the desired demand limit, Dt. Many consumers of electrical power strive to achieve the above mentioned ideal case.

However, the ideal case is frequently not encountered in actual practice. The present invention is designed to provide a signal indicative of the disparity between the desired and the non ideal case where the projected energy consumption during the demand period tends to be greater or less than the desired demand limit.

If the projected energy consumption is unequal to the predetermined energy consumption over the predetermined time period or demand period, the input to the integrating amplifier 36 will be other than zero. There will, therefore, be produced a signal $P_e$, at the output of the amplifier 36, which signal constitutes the output signal of the system. This output signal $P_e$, is a measure of the amount and the sense by which the load must be changed in order to make the actual energy consumption equal to the predetermined energy consumption at the end of the predetermined time period. The output signal $P_e$, is fed back to the summing amplifier 23 where $P_e$ is added to P, the instantaneous power. The summed signal is fed into the TDM 25 where it is multiplied by the signal representing the unelapsed time $(T-t)$. Therefore, the input to the integrating amplifier 36 becomes $$Dt - \int_0^t P\,dt - P(T-t) - P_e(T-t)$$

Assume that the sum of the first three terms remains constant. This corresponds to the case in which the energy consumption rate, P, is constant. Assume also that the projected energy consumption is not equal to the predetermined energy consumption, Dt. Therefore, as $(T-t)$ decreases, $P_e$ will increase such as to be indicative of the amount and the sense by which the load must be changed in order to make the energy consumption equal the predetermined energy consumption Dt.

The subject description relates to one embodiment of the invention. This description is not meant to be limitative insofar as specifics are concerned. Thus, any modifications, for example polarities or signal levels or the like which may be suggested to those skilled in the art are meant to be included therein.

The embodiments of the invention in which an exclusive property or privilege is claimed are defined as follows:

1. A computer for deriving a signal indicative of the difference between a predetermined energy consumption and a projected energy consumption by an electrical load over a predetermined time period, said computer comprising a time function generating means for generating an output time function signal representative of the unelapsed portion of said predetermined time period, detector means for generating a signal proportional to the energy consumption rate of said electrical load; integrating means; means connecting said detector means to said integrating means; a multiplier means; means connecting an output of said detector means to a first input of said multiplier means; means connecting the output of said time function generating means to a second input of said multiplier means, the output signal of said multiplier means representing a projected energy consumption over said unelapsed portion of said predetermined time period;

reference signal means defining a signal indicative of the magnitude of a predetermined energy to be consumed over said predetermined time period; and summing means for summing the output signals of said integrating means, said multiplier means and said reference means, whereby to produce a resultant signal indicative of the difference between said magnitude of said predetermined energy and the magnitude of said projected energy consumption.

2. The computer recited in claim 1 including control means for selectively controlling the operation of said integrating means.

3. The computer recited in claim 1 including means for selectively controlling said reference means such that said magnitude of said predetermined energy is varied.

4. The invention as set forth in claim 1 wherein said time function generating means comprises means for developing a fixed signal representative of said predetermined time period; third integrating means for developing a linearly time varying signal representative of elapsed time within said predetermined time period, and means for subtracting said linearly varying signal from said fixed signal whereby to establish a time function signal.

5. The invention as set forth in claim 1, including a second integrating means; means connecting the output of said summing means to the input of said second integrating means; means connecting an output of said second integrating means and said first input of said multiplier means, and an output terminal connected to the output of said second integrating means whereat a signal indicative of an amount by which said electrical load must be changed in order to establish coincidence at the end of said predetermined time period between said projected and said predetermined energy consumption.

6. The invention as set forth in claim 5 including second summing means, means connecting said output of said detector means to an input of said second summing means and means connecting an output of said second integrating means to an input of said second summing means, and means connecting an output of said second summing means to said first input of said multiplier means.

References Cited

UNITED STATES PATENTS

| | | | |
|---|---|---|---|
| 2,946,943 | 7/1960 | Nye et al. | 235—183 X |
| 3,237,448 | 3/1966 | Howell et al. | 235—183 X |
| 3,250,901 | 5/1966 | Brahm | 235—183 |
| 3,357,239 | 12/1967 | Hohenberg | 235—183 X |
| 3,362,217 | 1/1968 | Evans et al. | 235—183 X |

MALCOLM A. MORRISON, Primary Examiner

E. J. WISE, Assistant Examiner

U.S. Cl. X.R.

235—151.31, 183, 184